Aug. 25, 1942.                L. HOCHGRAF                 2,294,338
                          CROSS-TALK BALANCING
                          Filed Oct. 23, 1940
FIG. 1
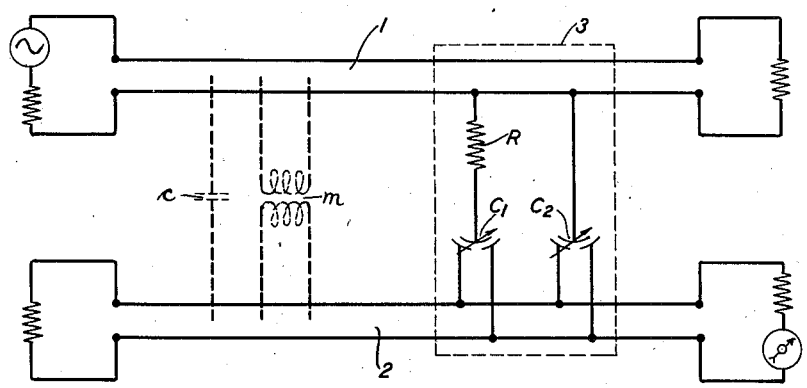
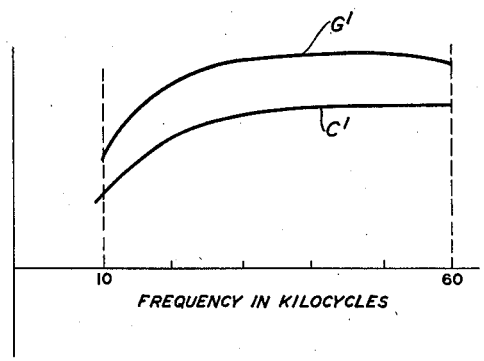
FIG. 2
FIG. 3
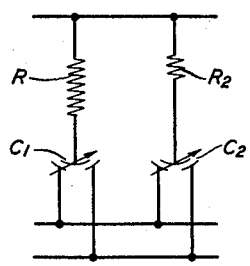
FIG. 4
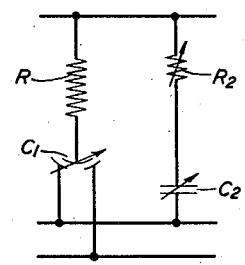
INVENTOR
L. HOCHGRAF
BY
N. S. Ewing
ATTORNEY Patented Aug. 25, 1942

2,294,338

UNITED STATES PATENT OFFICE 2,294,338

CROSS-TALK BALANCING

Lester Hochgraf, Maplewood, N. J., assignor to Bell Telephone Laboratories, Incorporated, New York, N. Y., a corporation of New York Application October 23, 1940, Serial No. 362,350

5 Claims. (Cl. 179—78)

This invention relates to the reduction of cross-interference between signaling circuits and more particularly to the neutralization of cross-talk in multipair cable systems.

Between signaling circuits that parallel each other for any considerable distance, as for example between conductor pairs in a telephone cable, there exists almost invariably a distributed electrical coupling through which signal power escapes from its proper circuit to appear in attenuated form in another as cross-talk. In practice such cross-talk may be reduced by providing special balancing or coupling units that transmit from each "disturbing" circuit to each disturbed circuit, signal currents of such phase and magnitude as to substantially neutralize the cross-talk appearing in the disturbed circuit. The distributed coupling, which is generally due to unavoidable unbalance in the electrical relation between the pairs, may be made up of a capacitive coupling component and a mutual inductance component or both. Where it is desired to reduce the total cross-talk contributed by these coupling components over a substantial frequency range difficulty is encountered inasmuch as the cross-talk contributed by each component varies with respect to frequency in both phase and magnitude, excepting as capacitance and mutual inductance balancing elements are used which have corresponding variations in transmission and phase angle over the frequency range.

One object of the present invention is to effect neutralization of cross-talk over a substantial frequency range without the use of mutual inductance in the balancing unit, and without elements which are modified to have a frequency characteristic similar to that encountered in signaling circuits, and more particularly to provide a balancing unit consisting of resistance and capacitance elements that is readily connected in the field and adjusted precisely without preliminary measurement of the cross-talk in phase and magnitude.

Another object is to provide a balancing unit of the kind described that avoids conductive connection between the signaling pairs.

A further object is to provide a unit of the character described that is continuously adjustable through a zero coupling value of capacity unbalance or mutual inductance unbalance or both.

The nature of the present invention and its various features, objects and advantages will appear from a consideration of the illustrative embodiments shown in the accompanying drawing and hereinafter to be described. In the drawing:

Fig. 1 illustrates a transmission system comprising a cross-talk balancing unit in accordance with the invention;

Fig. 2 comprises curve diagrams to which reference will be made in the description of Fig. 1; and Figs. 3 and 4 show modified forms of balancing units in accordance with the invention.

Referring now more particularly to Fig. 1 there is represented two conductor pairs 1 and 2 that are disposed in cross-talk producing relation throughout their lengths and which are coupled with a balancing unit 3 in accordance with the invention for neutralizing the cross-talk. It may be supposed for specific example that the pairs indicated are only two of many pairs included within the same telephone cable and that they are utilized for the transmission of signals in the same direction of transmission so that the cross-talk that appears is of the far-end type. It may be assumed further that the several pairs are used for the simultaneous transmission of voice frequency signals and multiplex carrier telephone signals, the latter occupying on each pair the frequency range from say 12 kilocycles to 60 kilocycles. The balancing unit may be disposed at any point within a repeater section, but it will be assumed in the following discussion that it is disposed near the receiving end of a section.

The distributed coupling between pairs that gives rise to cross-talk comprises in general, a capacitive coupling component, indicated at $c$, and an inductive coupling component, represented at $m$. Each of these coupling components gives rise to a corresponding component of cross-talk which varies in its own peculiar manner with frequency as a function of the characteristic impedance of the signaling circuit. The inductive coupling, moreover, does not behave as a pure mutual inductance but as a vector quantity, each component of which has its own law of variation with frequency. The net result is that the total cross-talk varies in phase and magnitude over the frequency range in a manner that is difficult to simulate in a balancing network that does not have capacitance and mutual inductance elements having corresponding frequency characteristics.

Applicant's balancing network 3 in its preferred form comprises, as illustrated, only resistance and capacitance elements. More particularly it comprises two intercircuit coupling paths, one consisting of a fixed resistance R in series with a differential condenser $C_1$ and the other consisting of a differential condenser $C_2$. One terminal of resistor R is connected to one or another of the conductors comprising pair 1, and the other terminal thereof is connected to the movable plate of condenser $C_1$. The two fixed plates of the latter are connected to the respective line conductors 2. The movable plate of condenser $C_2$ is connected to any one of the line conductors and the two fixed plates thereof are connected to the two conductors of the other pair. Each of the condensers $C_1$ and $C_2$ has constant parallel capacitance for all positions of the movable condenser plate; that is, the sum of the two condenser capacitances terminating on the movable plate is the same for all settings. Differential condensers have been used heretofore in cross-talk balancing units for their convenience in transferring the net balancing capacitance to one conductor or the other. In the present case, however, differential condenser $C_1$ serves the additional and important purpose of maintaining in conjunction with resistor R a constant phase angle for the transmission of current through R and $C_1$ regardless of the position of the movable plate of condenser $C_1$ and the magnitude of current flowing through R. The phase angle to which reference has been made is almost 90 degrees removed from the phase angle for transmission through condenser $C_2$ at a frequency near the higher frequency end of the band to be neutralized, hence adjustment of either condenser at such a frequency has but little effect on the other and the two condensers can therefore be very readily adjusted to their optimum positions. From an analytical standpoint the net capacitance introduced by the condenser $C_2$ may be thought of as comprising the algebraic sum of two capacitance components, one of which is effective to neutralize the cross-talk introduced by distributed capacitance $c$ and the other of which cooperates with the other branch of the balancing unit to neutralize the cross-talk introduced by distributed mutual inductance $m$.

The advantages of the invention with respect to ease of adjustment for cross-talk neutralization are appreciated to the fullest extent when a large number of pairs are to be balanced for cross-talk. Whereas it might be supposed that the cross-talk between each pair of circuits in the cable would have to be measured in phase and magniture at a plurality of frequencies in the signaling range and that each balancing unit would have to be individually designed to match the phase and magnitude of the distributed cross-talk coupling, such is not the case. The proportioning of the elements of the balancing unit is predetermined with reference to certain common characteristics of the cable circuits, and the units are then individually adjusted in the field while a single frequency tone is applied to the sending end of either of the signal circuits. The adjustment proceeds until the cross-talk tone in the disturbed pair is a minimum, and there is no measurement required of either the phase or magnitude of the induced cross-talk current.

To arrive at the best proportioning of the balancing unit, one may employ a cross-talk balancing bridge on any typical pair of circuits in the cable to ascertain what shunt conductance $G'$ and what capacitance $C'$ is required at each frequency to neutralize the cross-talk component due to mutual inductance $m$. Also to be ascertained is the capacitance required to balance the distributed capacitance $c$ between the circuits under measurement. The data thus obtained may then be plotted in the manner indicated in Fig. 2. It has been found that similar measurements on other pairs of circuits within the cable yield $G'$ and $C'$ curves of the same shape which differ from one another only by a proportionality factor, and that the ratio of $G'$ and $C'$ at each frequency throughout the range is substantially the same as the corresponding ratio for other pairs of circuits within the cable.

The next step in the procedure is to ascertain the proportions of a network comprising two parallel branches, one consisting of a capacitance and the other consisting of resistance and capacitance in series, that will most closely match the $G'$ and $C'$ curves. Although considerable latitude is permissible at this point, one may, for example, so proportion the network that an exact match is obtained at two points on the $G'$ curve and at one point on the $C'$ curve. For the system described with reference to Fig. 1, these points may be at 10 kilocycles and 40 kilocycles on the $G'$ curve and at 40 kilocycles on the $B'$ curve, where 40 kilocycles is the frequency of the test tone that is to be used on final adjustment of the balancing unit. Resistor R and the parallel capacitance of condenser $C_1$ in balancing unit 3 are then so chosen as to be in the same ratio as the corresponding elements of the network calculated from the Fig. 2 curves.

The absolute values of R and of the respective parallel capacitances of $C_1$ and $C_2$ determine what maximum cross-talk balancing coupling can be achieved with the unit and they are therefore to be fixed to accommodate whatever range of cross-talk magnitude is anticipated. In a typical case in practice involving cable circuits of nominally 135 ohm characteristic impedance, in which the characteristc impedance varied progressively from 144 ohms to 131 ohms over the frequency range from 10 to 60 kilocycles and in which the characteristic impedance had a capacitive phase angle ranging from 17 degrees to 8 degrees over the same frequency range, it was found that a suitable value for the resistance of R was somewhat more than 72,000 ohms, and that 215 micro-microfarads would suffice for the total parallel capacitance of each of the condensers $C_1$ and $C_2$.

It should be observed that the cross-talk balancing unit 3 may be completely assembled in the factory and that its installation in the field does not require breaking of any of the signaling circuits. The only apparatus required in the field for adjustment of the unit is for example a screw-driver or the like for adjusting the condensers $C_1$ and $C_2$ and a detector or other means for indicating when the adjustment results in maximum reduction of the test tone "cross-talk." It may be noted too that each of the adjustable elements permits of a zero coupling adjustment and that the effective coupling introduced may be continuously varied from positive to negative values. Resistors of high values, which tend to be either costly or unstable, are avoided and there is no conductive connection between pairs that might interfere with testing currents and direct current telegraph signals.

The balancing units are made of small size so that a large number of them may be installed on panels in the manner of M. A. Weaver Patent 2,080,217, May 11, 1937, and O. H. Coolidge et al. Patent 2,008,061, July 16, 1935.

Fig. 3 shows a cross-talk balancing unit that is essentially the same as the unit 3 in Fig. 1 excepting for the insertion of a resistor $R_2$ of low value in series with the movable plate of condenser $C_2$. The added resistor affords another degree of freedom in the design of the balancing unit so that a closer approximation can be had to the G' and C' curves of Fig. 2.

The modified form of balancing unit shown in Fig. 4, differs from that shown in Fig. 3 in two respects. First, the variable condenser $C_2$ is of the two-plate type rather than differential and therefore requires rewiring to the pair conductors to change from positive to negative values of coupling or vice versa. Second, the resistor $R_2$ is made variable so that it can be adjusted to optimum value for the particular pair combination between which it is connected.

Various other modified forms of the invention are possible within the spirit and scope of the appended claims.

What is claimed is:

1. In combination with a pair of long distance transmission circuits in cross-talk producing relation, means for sending signals over one of said circuits, means for receiving other signals from the other of said circuits, and means for neutralizing the cross-talk that tends to appear with the received signals comprising a cross-talk balancing unit connected between a point in said one circuit and a point in said other circuit, said balancing unit comprising two intercircuit connections, one of said connections comprising a capacitance and the other comprising an adjustable differential condenser and a resistor in series with each other.

2. A cross-talk balancing unit consisting of two intercircuit coupling paths, one of said paths consisting of a fixed resistor in series with an adjustable differential capacitance of constant parallel capacitance, whereby the phase angle of transmission through said one path is substantially independent of adjustment of said differential capacitance, and the other of said paths comprising an adjustable capacitance.

3. A combination in accordance with claim 2 in which said adjustable capacitance is a differential condenser.

4. A system comprising a multiplicity of adjacent circuits for the long distance transmission of different signals through the different circuits, and a cross-talk balancing unit connected between two of said circuits and comprising two intercircuit coupling paths of adjustable loss, one of said paths consisting of resistance and capacitance elements proportioned for constant phase angle substantially independent of the adjustment of loss, and the other of said paths comprising a capacitance.

5. A combination in accordance with claim 4 in which said phase angle is of the order of 90 degrees removed from the phase angle of said other path.

LESTER HOCHGRAF.